United States Patent
Chen

(10) Patent No.: US 7,471,527 B2
(45) Date of Patent: Dec. 30, 2008

(54) GREEN SWITCH POWER SUPPLY WITH STANDBY FUNCTION AND ITS IC

(76) Inventor: Weibin Chen, 6-505, Hai Yue Garden, No38, Mu Xu Yuan DaJie, Nanjing, Jiangsu (CN)

( * ) Notice: Subject to any disclaimer, the term of this patent is extended or adjusted under 35 U.S.C. 154(b) by 0 days.

(21) Appl. No.: 10/510,198

(22) PCT Filed: Jan. 27, 2003

(86) PCT No.: PCT/CN03/00072

§ 371 (c)(1),
(2), (4) Date: Sep. 29, 2004

(87) PCT Pub. No.: WO03/088463

PCT Pub. Date: Oct. 23, 2003

(65) Prior Publication Data

US 2005/0207189 A1     Sep. 22, 2005

(30) Foreign Application Priority Data

Apr. 18, 2002   (CN) ................... 02 1 12885
May 16, 2002   (CN) ................... 02 1 19637

(51) Int. Cl.
*H02M 3/335*     (2006.01)
(52) U.S. Cl. .................... 363/65; 363/21.18; 363/49; 363/97; 363/147
(58) Field of Classification Search ............. 363/21.12, 363/21.15, 21.16, 21.18, 49, 65, 97, 147
See application file for complete search history.

(56) References Cited

U.S. PATENT DOCUMENTS

| | | | | |
|---|---|---|---|---|
| 4,228,493 A | * | 10/1980 | de Sartre et al. ........... 363/56.1 |
| 4,628,433 A | * | 12/1986 | Notohamiprodjo ........... 363/65 |
| 4,860,188 A | * | 8/1989 | Bailey et al. .................. 363/65 |
| 5,115,185 A | * | 5/1992 | Fraidlin et al. .............. 323/207 |
| 5,267,135 A | * | 11/1993 | Tezuka et al. ................. 363/49 |
| 5,353,215 A | * | 10/1994 | Dinwiddie et al. ............ 363/65 |
| 5,703,764 A | * | 12/1997 | Hermann et al. ......... 363/21.16 |
| 5,905,491 A | * | 5/1999 | Kim ........................... 345/212 |
| 6,166,934 A | * | 12/2000 | Kajouke et al. ............... 363/65 |
| 6,297,976 B1 | * | 10/2001 | Isono .......................... 363/65 |

FOREIGN PATENT DOCUMENTS

| | | | |
|---|---|---|---|
| DE | 196 52 604 | * | 10/1997 |
| EP | 0 803 966 | * | 12/1997 |
| JP | 2001-119949 | * | 4/2001 |
| WO | WO 94/22207 | * | 9/1994 |

* cited by examiner

*Primary Examiner*—Jeffrey L Sterrett

(57) ABSTRACT

A switch power supply with standby function is disclosed. The power supply can satisfy the need of the green environment protection. And a single ended green switch power supply IC or thick film or modular circuit design with standby function is disclosed, too. It comprises a standby power supply, a main power supply, a PFC device, and a supplemental circuit, wherein a remote control signal is transmitted to main control circuit in response to a main error signal to control main power supply. A method for preventing switch power current from overload and saturation is disclosed too. Finally, the present invention also provides a green power supply with standby function as well as its IC associated with digital processing highly qualified PFC, and a PC standard (such as ATX, ATX12, SSI) computer switch power supply.

5 Claims, 13 Drawing Sheets

GREEN SWITCH POWER SUPPLY WITH STANDBY FUNCTION AND ITS IC

BACKGROUND OF THE PRESENT INVENTION

1. Field of Invention

The present invention relates to switch power supply, more particularly, relates to a green (environmentally friendly) switch power supply with standby function, the switch power supply comprises a standby power source, a main power source having a remote control, a PFC (power factor correction) device, and an supplementary circuit, wherein a monolithic green on/off power supply integrated circuit or thick film circuit, or modular circuit are applied, and the main power is controlled by a remote signal in response to an error signal, and finally, the present invention also provides a PC standard (ATX, ATX12, and SSI) for the power supply.

2. Description of Related Arts

Switching power converters are used in a wide variety of applications to convert electrical power from one form to another form. For example, DC/DC converters are used to convert DC power provided at one voltage level to DC power at another voltage level and AC-DC converters are employed to convert alternate current power into direct current power. At the same time, switching power converter could be categorized into isolated or non-isolated power converter, and the basic circuit of the converter can be configured to step up (boost), step down (buck), or invert type, even CCM (continuous conduction mode) or DCM (discontinuous conduction mode).

The isolated power converter could be further classified into single ended mode (including forward and flyback converter) and double ended mode (push-pull, half bridge and full bridge converter); the converting technique comprises hard-switched converters and soft-switched converters, and the controlling techniques comprise PFM (Pulse Frequency Modulation) mode control, PWM (Pulse Width Modulation), current mode control, voltage mode control and so on.

Regardless what methods or mode are used, a switching power circuit generally comprises a converter circuit having a power tube, a transformer, an inductance, and at least one rectifying filter output circuit, wherein the quantity of the power tube is subject to the choice of power converter mode, commonly, single ended converter comprises a power tube, the double ended converter comprises a plurality of power tubes. In case of the soft switch is applied, at least one more supplemental power tube is necessary. The inductance here is being used for the simple non-isolated DC/DC converter, while the choice of the chosen converter will simultaneously determine whether the inductance, single-ended or double-ended mode, hard switching or soft switching, to be applied in practice.

Further, the switching power circuit comprises a feedback circuit having a sample circuit, an error amplifier, and occasionally a feedback isolating circuit, wherein the sample circuit is adapted for sampling the current and voltage signal from the output circuit, and sending the sampled current and voltage signal to the error amplifier to obtain a comparative value, afterwards, the error amplifier will output an error signal.

Additionally, the switching power circuit comprises a control circuit including an adjustable pulse circuit and a drive circuit, wherein the adjustable pulse circuit having PFM (pulse frequency modulation) mode, PWM mode and so on. According to the error signal, the adjustable pulse circuit is capable generating a basic pulse, for double-ended mode, there is a scaling-down complementary double pulse circuit, for soft switching multi-pulse circuit, there is a multi pulse circuit. Commonly, basic pulse, double pulse and multi-pulse are supposed to be directed into the driven circuit. It is noted that a bigger error signal will result to a larger duty cycle ratio, as well as a higher peak value of the power tube current and a saturation susceptible transformer.

Finally, the switching power circuit also comprises an supplemental circuit which is selected from a group consisting of initiating circuit, protective circuit, voltage reference circuit, EMC circuit, and alternate rectifying filter circuit, wherein the protective circuit could be further classified into the lower voltage protective circuit, high voltage protective circuit and upper limit current protective circuit. Whenever the switch power supply is initiated or overloaded, the transformer and induction is susceptible to be saturated, and power tube is apt to be loaded with over current. So within the art, the power switching IC employs the upper limit protective circuit for protection, that is to say, when the current reach the upper limit, the power tube will be automatically shut off. Therefore, it is required that the control circuit to be promptly responsible and the power tube be equipped with instantaneously shutting-off function. Otherwise, there exist some sort of hidden risks for the power tube and transformer. For the initiating circuit, there are resistance initiating circuit and switch-off constant current source initiating circuit available within the art.

The single end converter circuit could be categorized into single ended forward converter circuit and single ended flyback converter circuit, wherein the single ended forward converter circuit comprises a magnetically reset circuit which is suitable for a powerful switching power supply.

PFC (Power Factor Correction) could be classified into the single phase PFC and three phases PFC, CCM (Continuous Current Mode) PFC, DCM (Discontinuous Current Mode) PFC, boost PFC, boost/buck PFC converter, and flyback PFC converter. Further, there are constant frequency controlling techniques, constant conduction time controlling technique, and equal area control techniques associated with the DCM mode. And there are peak value current controlling technique, average current controlling technique, lag loop current controlling technique, hard switch and soft switch technique associated with the CCM mode.

Regardless what kinds of converter and switching circuits are being used, a PFC device generally comprises a converter circuit having a power tube, a transformer, an induction, and an output circuit. In case of a soft switch is applied, at least one supplemental power tube and a soft switch circuit are employed. And in case of flyback converting mode is used, a transformer would be necessary.

The PFC device further comprises a feedback circuit having a sample circuit, an error amplifier wherein the sample circuit is adapted for sampling the current signal from the output circuit and then sending the sampled current signal to the error amplifier to generate an error signal.

The PFC further comprises a control circuit including an adjustable pulse circuit and a driven circuit, wherein the error signal is send to the adjustable pulse circuit and the driven circuit is adapted for driving the power tube. It is noted that there is a variety of adjustable pulse circuits available depending which kind of converter circuits and the controlling techniques being used. Commonly, the most used control circuits include constant conduction time control circuit (for example, UC3852, after the power tube is conducted, the induction current will be increased and the conduction time will be determined by the error signal outputted by the error amplifier, after the power tube is shut off, the induction current will be decreased; if the induction current is fallen down to zero, the power tube will be conducted again indicating that the circuit is performing at a transition point between DCM and CCM). Some popular control circuits also include average time control circuit (for example, UC3854 comprising a multiplicator, an current error amplifier, PWM, and an oscillator), flyback converter control circuit, soft switching control circuit, and so on.

Finally, the PFC device also comprises a supplemental circuit which is selected from a group consisting of initiating circuit, protective circuit, voltage reference circuit, EMC circuit, alternate rectifying filter circuit. To prevent the PFC outputting voltage being excess the upper limit, designers within the art have to balance the following factors, such as the outputting capacity of the capacitor, power factors, and total harmonic distortion. In other words, users have to sacrifice some factors to achieve a feedback function. For instance, when the circuit is under a heavy load, the power factor will be reduced and the total harmonic distortion will be accordingly increased. However, sacrifice could solve all troubles, in case of the outputting voltage excesses the design value, or the outputting is converted from a heavy load to a light load suddenly, the control circuit sometimes is unaware or unable to judge whether the outputting voltage being over the upper limit. This is due to some inherent factors of voltage error feedback and input voltage filter waves. As a result, there still exist potential risks in conventional PFC circuits.

A green switch power supply comprises a standby power supply and a main power supply, wherein the standby power supply refers to power-frequency transformer rectifying standby power supply adapted for outputting a voltage range from a couple of watts to a tens of watts. Preferably, the power consumption should be lower under a load-free circumstance. For a green switch power supply adapted for outputting a higher power, a PFC device and EMC circuits are necessary. According to the prior art, the standby power supply and the main power supply are separately designed. At the same time, people have been devoted enormous enthusiasm onto the design of the standby power supply and the single power supply. There is no applications or designs concerning too much about the green switch power supply, i.e. a combined design for reducing the overall costs. For standby power supply, a common approach is to provide a linear regulated power supply, which is not environmentally friendly. A better approach is to provide an independent standby switching power supply, for example, IC switching power supply of TOP series. But this kind of power supply is so expensive.

For the main power supply, there is no special main power IC available in the market. So nowadays, according to the devices and techniques available on the market, the green switch power supply are either so expensive or non-applicable.

SUMMARY OF THE PRESENT INVENTION

A primary object of the present invention is to provide a green switch power supply, which is environment friendly and cost effective.

Another object of the present invention is to provide a green switch power supply, which is able to overcome the above mentioned drawbacks of prior art.

Another object of the present invention is to provide a green switch power supply, a green switch power supply IC, and a PC standard (e.g. ATX, ATX12, SSI) switch power supply.

Accordingly, to achieve the above object, the present invention provides a green switch power supply, comprising:
a standby power supply;
a main power supply;
a PFC device; and
a supplemental circuit;

wherein the main power supply is subjected to a remote signal to be on/off, the standby power supply is adapted for at least supplying a necessary power to the main power supply, the DC input terminal of the main supply power and the DC input terminal of the standby power supply being shared with a common ground;

The standby power supply comprises a standby converter circuit, a standby feedback circuit, a standby feedback circuit, a standby control circuit and a standby supplemental circuit, wherein the standby control circuit and DC input terminal of the standby power supply being shared with a common ground. The standby power supply is embodied as a RCC switching power supply or a power transformer DC power supply.

The main power supply comprises a main converter circuit, a main feedback circuit, a main control circuit and a main supplemental circuit, wherein the main control circuit and the main power supply DC input share a common ground.

The supplemental circuit is selected from a group consisting of power-on initiating circuit, AC rectifying filter circuit, voltage reference circuit, EMC (Electromagnetic Compatibility) circuit.

The PFC device comprises a PFC converter circuit, a PFC feedback circuit, a PFC control circuit, and a PFC supplemental circuit. Alternatively, a passive PFC device could be applied. It is noted at least an output of the PFC device is embodied as a DC input of main power supply.

The standby converter circuit of the standby power supply comprises a standby power tube, a standby transformer, and at least one standby rectifying output circuit. From a cost perspective, the standby converter circuit commonly employs the single ended flyback converter circuit. In case of a great power is required, the standby control circuit could employ the single ended forward converter circuit or single ended hybrid converter circuit, the power tube is directly driven by the standby control circuit, so that the soft switching converter circuit and the double ended converter circuit are eliminated from the options.

The standby feedback circuit could be embodied as an isolated standby feedback circuit or a non-isolated standby feedback circuit, wherein the isolated standby feedback circuit comprises a standby sample circuit, a standby error amplifier, a standby isolation circuit (commonly an optically coupled isolator is used in applications), wherein the standby sample circuit is adapted for sampling a voltage signal and then sending the sampled voltage signal to the standby error amplifier to generate a standby optically coupled current, and finally to output an standby error signal via the standby isolation circuit. It is worth to mention that the weaker the standby optically coupled current signal is, the bigger the standby error signal would be.

The standby non-isolated feedback circuit comprises a standby sample circuit, a standby error amplifier wherein the standby sample circuit collects the signal which is applied as the voltage signal of the standby control circuit for the standby power supply and proportionally matched with the standby output voltage signal after the filtration by the standby transformer winding. After then, the collected signal will be send to the standby error amplifier to output error signal. It is understood that the standby non-isolated feedback circuit is suitable for being used to output non-accuracy voltage, and for being used in a cost effective way.

The standby control circuit comprises a standby pulse adjustable circuit and a standby driven circuit, wherein the standby pulse adjustable circuit is adapted for generating a standby pulse in response to the standby error signal. If the standby converter circuit is embodied as a single ended standby converter circuit, the standby pulse will be directly send into the standby driven circuit, and the standby driven circuit is adapted for driving the standby power tube. The standby pulse adjustable circuit could be classified into PFM mode, PWM mode as well as other modes. The PFM mode refers to the standby pulse frequency adjustable circuit and standby pulse width shaping circuit, and the PWM refers to the standby pulse width adjustable circuit and standby oscillator.

Finally, the standby supplemental circuit is selected from a group consisting of standby protective circuit, standby voltage monitor circuit and so on.

The main converter circuit of the main power supply comprises a main power tube, a main transformer, at least a main rectifying filter output circuit. To save the cost, the single ended main converter circuit is applied and the main power tube is directly driven by the main control circuit, in case of a converting efficiency is required, a single ended soft switch main converter circuit could be desirable.

The main feedback circuit is embodied as a main isolation feedback circuit comprising a main sample circuit, a main error amplifier, a main isolation circuit (commonly isolated by optically couple), a remote control circuit, wherein the main sample circuit is adapted for sampling a voltage output signal and then sending the sampled voltage output signal to the main error amplifier to generate a main optically coupled current. Afterwards, the optically coupled current will output a main error signal via the main isolation circuit. It is noted that the optical coupling is applied in the remote control circuit for sending remote control signal to the main control circuit.

The main control circuit comprises a main pulse adjustable circuit, a main driven circuit, and a main power prohibitive circuit. In case of the remote control signal is off, the main power prohibitive circuit will force the main driven circuit to output a lower electrical level to shut off the main power tube, otherwise, the main pulse adjustable circuit would generate a main pulse in response to the main error signal. If the single ended main converter circuit is applied, the main pulse will be directly send to the main driven circuit, and then the main driven circuit will normally drive the main power tube. It is noted that the main pulse adjustable circuit could be embodied as PFM mode, PWM mode and so on. For PFM mode, a main pulse frequency adjustable circuit or a main pulse width shaping circuit could be possible, for PWM mode, a main pulse width adjustable circuit and a main oscillator are of options. The main supplemental circuit is selected from a group consisting of main protective circuit, main voltage monitoring circuit.

The PFC converter circuit of the PFC device comprises a PFC power tube, a PFC transformer or a PFC induction, at least a PFC output circuit, wherein the PFC transformer is flyback mode if the flyback converter is being applied. The PFC feedback circuit comprises a PFC sample circuit, a PFC error amplifier wherein the PFC sample circuit is adapted for sampling a voltage signal from the PFC output circuit, and then sending the sampled voltage signal to the PFC error amplifier to output a PFC error signal. The PFC control circuit comprises a PFC pulse adjustable circuit and a PFC driven circuit wherein the PFC error signal is send to the PFC pulse adjustable circuit and the PFC driven circuit is adapted for driving the PFC power tube. The PFC supplemental circuit is selected from a group consisting of PFC initiating circuit, PFC protective circuit and AC rectifying circuit.

The operation of the main power supply is subject to the remote control signal. That is to say, according to the main error signal, the remote control signal is capable of enabling the main control circuit to operate the main power supply. There is a working power supply associated with the main control circuit. If there is no working power supply associated with the main feedback circuit, the main error signal should be less than a threshold value (commonly, the minimum value). As a result, when the remote control signal is off, the main error signal is forced to be less than the threshold value or the minimum value. When the remote control signal is on, there is no effect impact on the main error signal. In case of the main error signal is less than threshold value, the remote control value is assumed to be off and the main power supply will be shut off by the main control circuit. It is noted that the threshold value is selected from the minimum value of the main error signal (commonly 0) to a maximum value of the main error signal (commonly 100%). Generally, the threshold value is a fraction of the maximum value. When the threshold value is optimally chosen, the main power supply is easily to be set On and Off thus improving the overall efficiency. For example, if the threshold value is 25%, and the load of the main power supply is less than 25%, the main power supply is apt to be working cyclically.

Therefore, the above mentioned main power supply circuit has been converted to an isolated circuit associated with a built-in remote control circuit, wherein the isolated circuit is capable of forcing the main error signal to be less than the threshold value (for instance, forcedly adjusting the voltage signal of the main output, or forcedly adjusting the main optically coupled current, or directly cutting off the working power supply of the main feedback circuit) if the remote control signal is off. However, if the remote control signal is on, the remote control circuit will be neutralized to out of function. At the same time, the main sample circuit will sample the voltage signal from the main output, and subsequently send to the main error amplifier to generate a main optically coupled current and ultimately outputting a main error signal via the main isolation circuit. Preferably, when the voltage signal of the main output has a bigger value than the preset value, the main optical couple is current free, and the main error signal is minimized. Otherwise, a bigger derivation of the main output voltage signal would result to a bigger main optical coupled current, and finally cause a higher main error signal.

The main power supply prohibitive circuit is adapted for monitoring the main error signal of the main feedback circuit. If the main error signal has a value less than the threshold value, the remote control signal is considered to be Off, thus forcing the main pulse adjustable circuit stop outputting pulse and forcing the main driven circuit outputting a lower electrical level, or even other procedures to shut off the main power supply. Otherwise, according to the main error signal, the main pulse adjustable circuit would output a main pulse, and the main driven circuit would normally drive the main power tube (commonly, the single ended power tube is driven by DC); to ensure that the main feedback circuit not associated with a working power supply has a main error signal valued less than the threshold value, a resistance or a constant current source could be applied in the main control circuit to pull down the inputted main error signal.

The green switch power supply according to the first preferred embodiment of the present invention further comprises a green switch power supply IC having a standby control circuit, a main control circuit and a supplemental circuit. The supplemental circuit comprises a pedestal generator, an initiating circuit, and an offset circuit wherein the pedestal generator is adapted for providing a reference voltage to the internal circuit, the initiating circuit is adapted for creating an initiating working condition for internal circuit and the offset circuit is adapted for establishing an offset for the internal circuit. While the standby pulse adjustable circuit and the main pulse adjustable circuit both employ the PWM mode and apply the same working frequency, the standby pulse adjustable circuit and the main pulse adjustable circuit could share the PWM oscillator thus further reducing the costs.

Furthermore, the green switch power supply IC comprises a PFC error amplifier, a PFC control circuit, a sample circuit for sampling the working voltage of the IC and a standby error amplifier. Commonly, a green switch power supply being equipped with the IC of the present invention is supplied by a standby power supply, so that the internal feedback circuit will limit the maximum working voltage of the IC. It is noted that the standby feedback isolated circuit and the internal standby feedback circuit are being used simultaneously, wherein the internal feedback is adapted for limiting the outputting voltage. As a result, the IC of the present invention is suitable for being used for a lower voltage output accuracy thus saving the costs of such green switch power supply.

Furthermore, the remote control signal which is correspondingly mated with the main error signal is feed into the main control circuit, wherein a main power supply IC is utilized for integrating the main control circuit.

The green switch power supply according to the preferred embodiment of the present invention could be a kind of thick film circuit comprising a standby control circuit, a standby feedback circuit, a main control circuit, a main feedback circuit. Preferably, the thick film circuit comprises a PFC feedback circuit and a PFC control circuit.

The green switch power supply according to the preferred embodiment of the present invention could be a kind of modular circuit comprising a standby control circuit, a standby feedback circuit, a main control circuit, a main feedback circuit. Preferably, the thick film circuit comprises a PFC feedback circuit and a PFC control circuit.

The present invention further provides a PC standard (for example ATX, ATX12, SSI and so on) green computer power supply, comprising a standby power supply, a main power supply wherein a standby converter circuit of the standby power supply is embodied as a single ended converter circuit, and a main converter circuit of the main power supply is embodied as a single ended forward converter circuit or a single ended hybrid converter circuit. Furthermore, the above mentioned green switch power supply comprises PFC devices.

The present invention further introduces a kind of single ended hybrid switch power supply converter circuit, wherein at least one path is adapted for single ended forward outputting, and at least another path is adapted for single ended flyback outputting, any single path of single ended forward outputting is able to be common-channeled with certain path of single ended flyback outputting.

In other words, the single ended forward pulse current is outputted, and the exciting current is arranged not back to the DC input terminal (winding magnetic resetting), but bleed to the output terminal of the switch power supply through the secondary winding. It is noted that the secondary winding is independent secondary winding or share with other forward windings. Since the energy of the exciting current is designed less than the energy of the forward conversion, so that one outputting terminal having higher power outputting rate could be chosen for outputting the exciting current. So in the later design for the single ended hybrid converter circuit, the effective magnetic resetting of the inputting terminal could be less than the permissible DC input voltage, therefore, the number of windings could be reduced. As a result, the switch power tube's voltage withstanding capabilities have been significantly improved, a wider range of inputting voltage could be accepted, and finally the manufacturing process of the switch transformer could be simplified.

The present invention further provides a method for preventing current overloading and saturation of a switch power supply, comprising:

1) checking whether a primary current of an transformer, a current of an induction and a current of a power tube being excess an upper limit current;

2) generating an adjusting signal directly or indirectly adjusting an error signal if the upper limit current is excess the upper limit, so that during subsequent adjustable periods, a duty cycle is reduced, the primary current or the induction current or power tube peak current value are reduced, wherein the error signal is outputting signal from an error amplifier or is inputting signal from a pulse adjustable circuit, the error adjustable signal is a direct error adjustable signal, the indirect adjusting signal is an inputting signal from an error amplifier or an outputting signal from a sample adjustable circuit to adjust the error signal.

In the step 2), if an over-limit current was detected, the error signal would be adjusted, and the adjusting capacity is a fixed value.

The step 2) further comprises a step for continuously adjusting the error signal during the subsequent adjustable periods if an over-limit current is detected, wherein the adjusting capacity is an gradually decreased value, from a maximum value to 0; It is noted that during the subsequent adjustable periods, in case of the upper limit current is excess again, the adjusting procedure will be restarted gradually decreasing from the maximum value to 0.

The present invention further provides an overloading and saturation preventative switch power supply according to the above mentioned procedure, comprising:

a converter circuit comprising a power tube, a transformer (or an induction), at least a path of rectifying filter outputting circuit, and sometimes a soft switch circuit;

a feedback circuit comprising a sample circuit, an error amplifier, and sometimes a feedback isolation circuit;

a control circuit comprising a pulse adjustable circuit and a driven circuit, where the pulse adjustable circuit is selected from a group consisting of PFM mode, PWM mode and so on; and a supplemental circuit.

wherein a protective circuit of the supplemental circuit comprises a serial of transformer primary or power tube current sample circuit, a serial of transformer primary or inductance or power tube upper limit current detecting circuit, and a regulating circuit adapted for directly and indirectly regulating the error signal according the outputted signal from the detecting circuit, wherein the regulating circuit is a D flip-flop being downward edge triggered and high electrical level preset. The clock signal of the D flip-flop is the pulse adjustable signal of the control circuit. In response to the error signal from the feedback circuit, the pulse adjustable signal generate a basic pulse, and the data terminal of the D flip-flop will be feed into with a low electrical level. And the preset input terminal of the D flip-flop will be feed into the outputted signal from the detecting circuit. If the D flip-flop is under a high electrical level, the open circuit will output a error regulating signal. Therefore, whenever an over limit current is detected, the regulating circuit will automatically regulate the error signal. It is noted that the regulating volume is a fixed value.

According to the present invention, the converter circuit of the switch power supply is single ended converter circuit, and the power tube is triode, the driven circuit comprise at least two path of output signal, one path is coupled with the base of the triode, and the other path is coupled with the emitter of the triode. The base of the triode is electrically connected with a high voltage power source via a highly resistible resistance. Associated with related circuits, the highly resistible resistance and triode of the converter could be applied as a portion of the power on initiating circuit, so as to improve the withstanding of the triode.

The switch power supply of the present invention utilizes a single switch power supply IC which at least integrates a portion of control circuit and protective circuit.

The present invention further provides a digital process and high quality PFC (power factor correction) method, wherein a reference circuit and a PFC reference signal are applied for replacing the conventional feedback circuit and error signal. The reference circuit comprises a series of voltage signal sample circuit of the output circuit, voltage signal detection or module converter (A/D) circuit, reference logic circuit and reference output circuit. the reference logic circuit is adapted for digitally processing the voltage signal so as to generate a digital reference signal, and for regulating the reference signal at a plurality of preset cycle point, wherein during each cycle, the reference signal is kept constant. The cycle is integer multiple of the commercial power, and each ending point of the cycle is synchronized with the edge of the commercial power half cycle. In other words, the cycle is much larger than the half cycle of the commercial power.

The present invention further provides a PFC device based on the above digital process and high quality PFC method, which comprises a converter circuit having power tube, a transformer or an inductance, an output circuit, a reference circuit, a control circuit having a pulse adjustable circuit and a driven circuit wherein the reference is feed into the pulse adjustable circuit for controlling a generation of a pulse, and a supplemental circuit selected from a group consisting of initiating circuit, protective circuit, voltage reference circuit, EMC circuit and so on.

According to the present invention, the pulse adjustable circuit comprises a ratio current circuit, a timing circuit, a pulse width adjustable logic circuit, a current amplifier and an oscillator wherein the PFC reference signal is applied as the output of the ratio current circuit, a pair of digital signal of the timing circuit are send to the pulse width adjustable logic circuit which in turn is adapted for outputting a pair of digital signal to the timing circuit, the output signal of the current amplifier is send to the timing circuit, the output signal from the oscillator is send to the pulse width adjustable logic circuit, finally the pulse width adjustable logic circuit will output a pulse signal. The different portion of the pulse width adjustable logic circuit will be discussed in details later.

The PFC device of the present invention utilizes power factor to correct IC which comprises a portion of reference circuit and control circuit.

Finally, the present invention also provides a optimal technique version for the green switch power supply IC, the standby power supply is single ended flyback mode or single ended hybrid mode, PWM mode is applied, the standby power tube is directly driven by the standby driven circuit, the overload and saturation preventive design is fulfilled, the main power supply is singled ended flyback or hybrid mode, and of PWM mode, shares a PWM oscillator with the standby power supply, the main power tube is directly driven by the main driven circuit, the remote control signal, with response to the error signal, is adapted for controlling the main power supply on/off, and an overload and saturation preventive design is fulfilled. The PFC device is embodied as a digital process and high quality PFC method.

Conclusively, the green switch power supply equipped with the monolithic green switch power supply IC design not only simplifies the circuit, but also reduce the overall costs significantly. In short, the application of thick film and modular circuit make the power supply more reliable and facilitate the maintainability process. The remote control design could further reduce the costs and prevent any accidental operation. What is more, the single ended forward converter has been replaced single ended hybrid mode converter, so that the voltage withstanding of the power tube has been improved. Finally, the overload and saturation preventative and digital processing PFC method further enhance the quality of the power supply. The above mentioned techniques could be used as PC standard (ATX, ATX12, SSI) so as to efficiently reduce the costs and improve the power supply quality and reliability.

These and other objectives, features, and advantages of the present invention will become apparent from the following detailed description, the accompanying drawings, and the appended claims.

DETAILED DESCRIPTION OF THE PREFERRED EMBODIMENT

Figure 1:
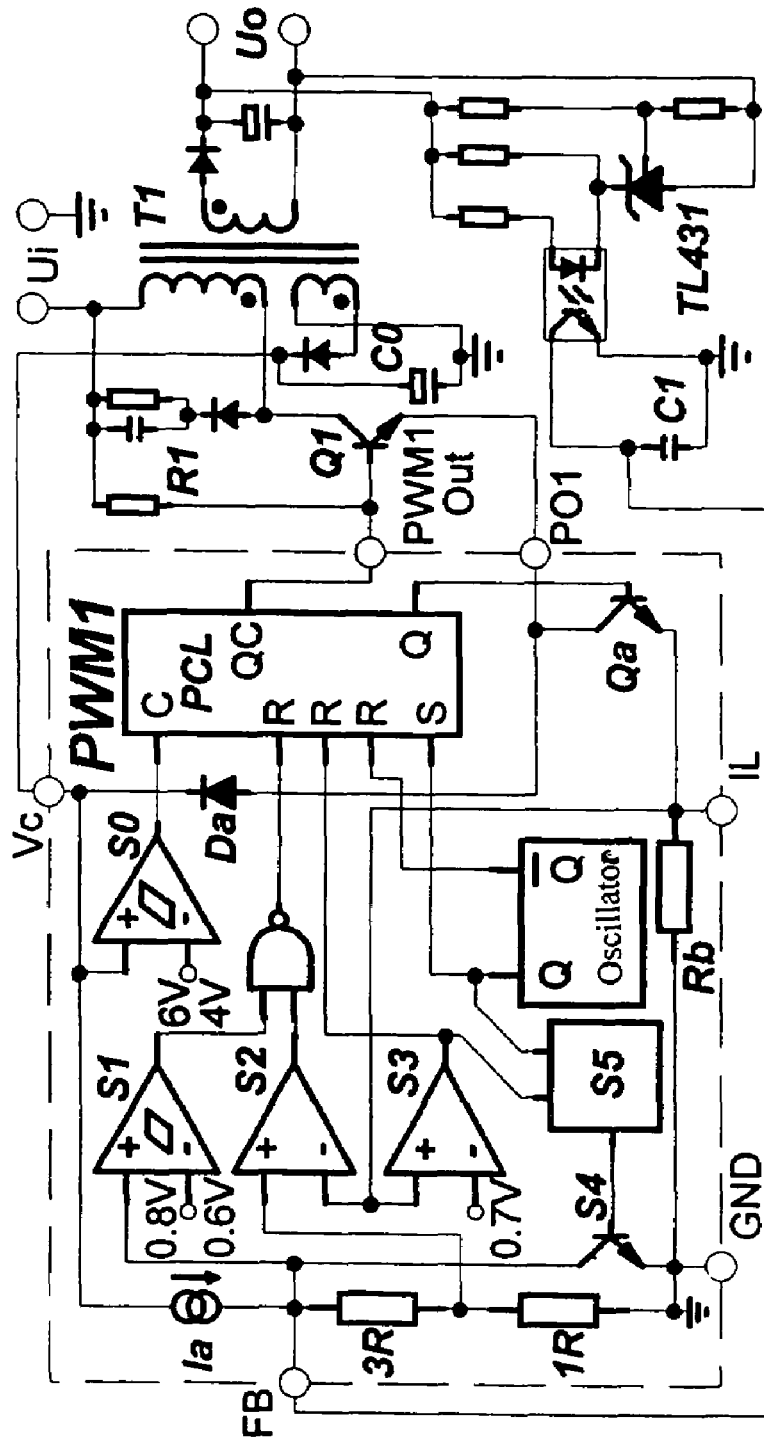
FIG. 1 is a schematic diagram of an undefined PWM switch power supply having an initiating circuit to prevent overload and saturation.
Figure 2:
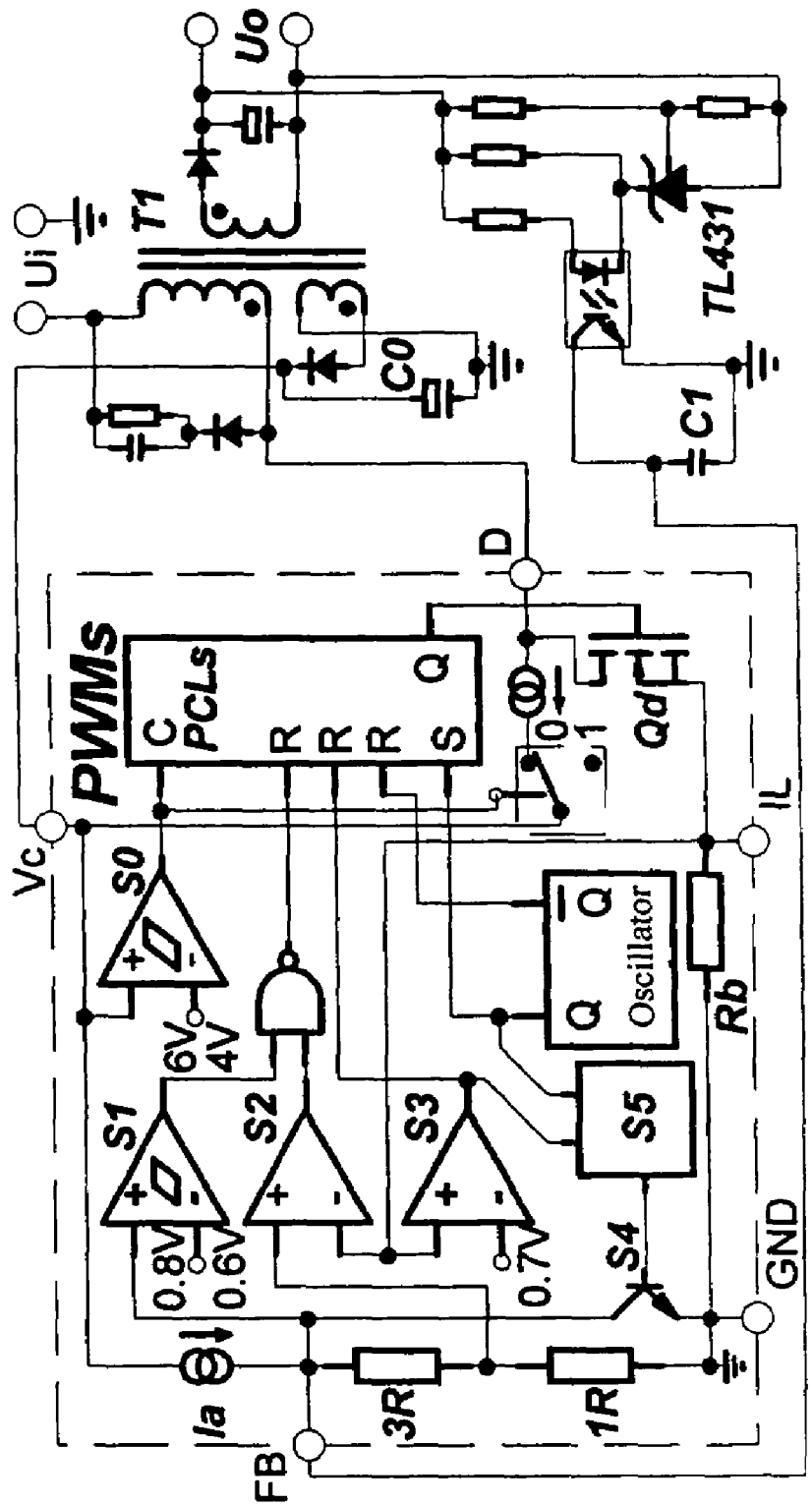
FIG. 2 is a schematic diagram showing an alternative mode of an unqualified PWM switch power supply having an initiating circuit to prevent overload and saturation.

Referring to FIG. 1 and FIG. 2, the independently used switch power supply, for example a charger, a green switch power supply IC standby power supply unit, or a universal switch power supply is illustrated. Q1 is an economical power bi-polar transistor; Qd is a power tube such as a power MOSFET or a an insulated gate bi-polar transistor; the region circumscribed within the dash line is IC portion. It is noted that Rb and Qa could integrated in the IC portion or apart with the IC portion according to the semiconductor manufacturing process. Furthermore, Rb could be integrated within the IC portion according to the optimizing request of a lower power output. In case of a higher output power is needed, the Rb could be coupled with an external resistor in a parallel manner for outputting a bigger power.

Figure 3:
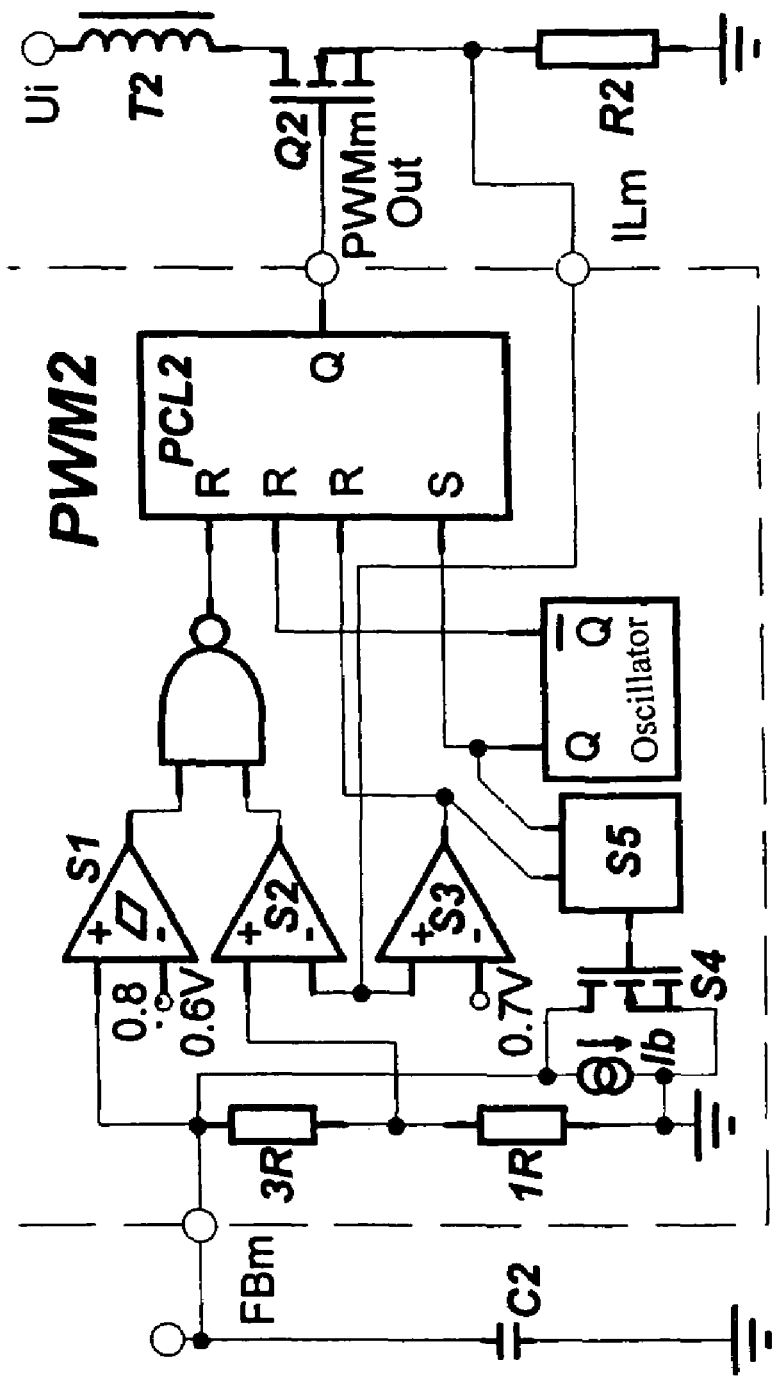
FIG. 3 is a schematic diagram of an overload and saturation preventative undefined PWM switch power supply according to the preferred embodiment of the present invention.

As shown in FIG. 3, a main power supply adapted for being used as a green switch power supply is illustrated. The region circumscribed by the dash line is IC portion, the power tube Q2 could be either integrated in the IC portion or disposed outside the IC portion. Ia and Ib are current source. Accordingly, Q2 and Qd are power tubes which are power MOSFET, or IGBT (insulated gate bipolar transistor).

S0 is a Schmidt comparator. The working condition of the IC power supply voltage monitoring circuit is subject to the condition of the S0. That is to say, if the S0 is in a lower level, the IC power supply voltage monitoring circuit is set in an initiating state, instead, if the S0 is in a high level, the IC power supply voltage monitoring circuit is set in a normal state.

As shown in FIG. 1, the IC power supply voltage monitoring circuit is set in an initiating state, QC terminal of a trigger device PCL (hereafter called PCL.QC) is set as high resistance (or output is controllable), the high-voltage high-resistance value R1 provides a base micro-current enabling the power tube Q1 to be conductible under a lower collected current, and to be charging the IC power supply capacitor C0 through diode Da to form an initiating circuit. To ensure that Q1 could be safely initiated, the following procedures could be followed, such as checking the charging current, controlling the PCL.QC outputting, altering Q1 base current, and enabling the Q1 current to be safe value. While the IC power supply voltage monitoring circuit is set in a normal state, PCL.QC and Qa is outputting normally, R1 is disabled. Therefore, if the Q1's amplifying function is considered, and compared with the resistance limited current initiating circuit, the initiating circuit under a normal state will be reduced to a less extent.

As shown in FIG. 2, under an initiating state, capacitor C0 is charged by high voltage high current power supply to form PWMs initiating circuit; under a normal state, PWMs is resumed to be a normal state, and the high voltage current power supply is cut off. As shown in FIG. 3, since the main power supply and the standby power supply share IC power supply voltage monitoring circuit, so that S0 is effective towards PWM2, under the initiating state, PWM2 is cut off.

As shown in FIG. 1, under a normal state, the output from PCL.QC and Q terminal of the trigger device PCL (hereafter call PCL.Q) is the same. For example, if the output is high electrical level, Q1 and Qa is conductible, Rb is adapted to check the instantaneous current of Q1; if the high level output converts to a lower level, Qa will be cut off, due to the fact of memory effect, Q1 will not cut off immediately, and diode Da will be fly-wheel, or a time delay circuit is designed to delay Qa' off until Q1 is cut off, or Qa force emission terminal of Q1 clamping to be a value 1.5V, as a result, the base voltage of Q1 0V will be reverse bias so as to increase the withstand voltage of the collector of Q1.

As shown in FIG. 2, under a normal state, if Q terminal of trigger device PCLs (hereafter called PCLs.Q) outputs a high electrical level, Qd will be conductible, Rb is adapted for checking the instantaneous current of Qd; if the output is a lower electrical level, Qd will be cut off. As shown in FIG. 3, under a normal state, if Q terminal of trigger device PCL 2 (hereafter called PCL2.Q) outputs a high electrical level, Q2 is conductible, R2 is adapted for checking the instantaneous current of Q2; if the output is low level, Q2 is cut off.

S2 and PWM comparator shares a same mechanism, that is, as long as the oscillator Q arisen, the power tube is conductible, the primary current of the transformer will be increased as well as the voltage drop. When the voltage drop equal to or bigger than the error signal which are represented as voltage UC1 or UC2, S2 will output a lower electrical level and the power tube will be cut off; However, the maximum cycle ration is determined by the oscillator, that is to say, if the output from the S2 is high level, oscillator Q will convert to a lower level and the power tube will be cut off; here, the schmiter comparator S1 could be embodied as a main power supply prohibitive circuit. if the error signal has a value less than the threshold value, then the power tube cycle will be forcedly cut off, instead, if the error signal value higher than the threshold value, the power tube cycle will be turned on, so as to increase the conversion efficiency while the switch power supply is light loaded.

The upper limit current comparator S3 could be embodied as an upper limit current checking circuit. In case of the primary transformer or power tube reach the upper limit current, S3 is capable of enabling the overloading and saturation preventative logic S5 and simultaneously turn off the power tube. There are several methods available, according to the present invention, S5 is enabled only once, and S4 is adapted for conducting an oscillator cycle if the following circumstance is satisfied. The current of S4, namely I4, should be bigger current than the current source Ia or the main voltage feedback current minus current source Ib. (as shown in FIG. 3, the difference value is Ic). It is noted that I4, Ia and Ic have attributed to the UC1 and UC2 within a single PWM cycle are ranged within 2.8V*(−10%), while the maximum current output should be above 95%. In case of the assignment from Ia towards UC1 is 2.8V*3.3%, I4 could be selected three or four times bigger than Ia. As a result, the error signal will be weakened, so in the next PWM cycle or the following PWM cycle, the duty cycle will be decreased and the primary current of the transformer and the peak current of power tube will be decreased as well.

For those quick power tubes, transformers having bigger capacities, and quick responding control circuit, the error signal will be located close to the maximum value if overloading. For those slow power tubes, transformers having limited capacities (once the transformer is saturated, the primary current will increase to excess the upper limit), or retarded response control circuit, the error signal will be less than the theoretical maximum value, so the control circuit will turn off the power tube in advance. Even though there are still existed some chances that power tube having upper limited current or transformer saturation, however, the time is limited and the safety of the power tube and transformer could be guaranteed.

Another method is to enable S5 once, I4=Ia (Ic)*1.2; In the succeeding PWM cycle, if the S5 is not enabled, I4=Ia(Ic)

*0.8, afterwards, the S5 is disabled. It is noted that above multiple constant 1.2 and 0.8 could be bigger than 1 or less than 1, the exact value should be referenced by the instantaneous response of the switch power supply. This method could further improve the protection for the power tube and transformer so as to increase the maximum current output. What is more, S5 could be embodied as a digital processing logic to deal with the overloaded I4. To achieve a better monitoring effect, S5 is optimized to output an overloading monitoring signal.

As shown in FIG. 1, FIG. 2 and FIG. 3, the single ended continuous current mode is embodied, as a result, PCL, PCLs, PCL2 and S5 are implemented with time delay circuit for preventing a pinnacle from being started which could accidentally turn off or enable S5.

It is worth to mention that above overloading and saturation preventative switch power supply PWM control techniques are also applied in push-pull, half-bridge, and full-bridge structure. If the primary current of the power tube and transformer is checked over upper limit by the overloading and saturation preventative circuit, then the error signal will be forcedly adjusted (for example, adding force adjusting pin3 and pin4 level to S3, S5), so that in the next or subsequent PWM cycle, the duty cycle ration will be fall down, and the peak current of the power tube and transform-primary will be reduced as well, as a result, the power tube and the transformer are well protected thus significantly improving the security and reliability of the switch power supply.

In other words, a single ended PWM control circuit which adopted an economical switch power triode, comprises an input and output respectively coupled with the base and emitter of the triode, wherein the base of the power tube includes a high voltage, highly resistant resistance connected with the high voltage source or collector of the power tube (via the transformer-primary to coupled with high voltage source). Under the enabling state, the high voltage, highly resistant resistance (output being controllable), which is coupled with the base, is adapted for providing the power tube a base micro-current, and the current of the emitter of the power tube will charge the IC power supply filter capacitor through the diode so as to accomplish the starting up process. Under the normal state, PWM is in positive period, one path enables the power tube to be positive biased, while another path drops down the emitter of the power tube, then the power tube is conductible; if the PWM is in negative period, one path drops down the base of the power tube. Due to the fact of the memory effect, the power tube will not be cut off immediately, the emitter of the power tube could be fly wheeled by the diode, or the emitter of the power tube could be dropped down to delay the time until the power tube is cut off, or until the emitter of the power tube being clamped. It is noted that after the power tube is cut off, the base of the power tube is negative biased so that the voltage withstanding of the collector of the power tube have been significantly improved.

Figure 4:
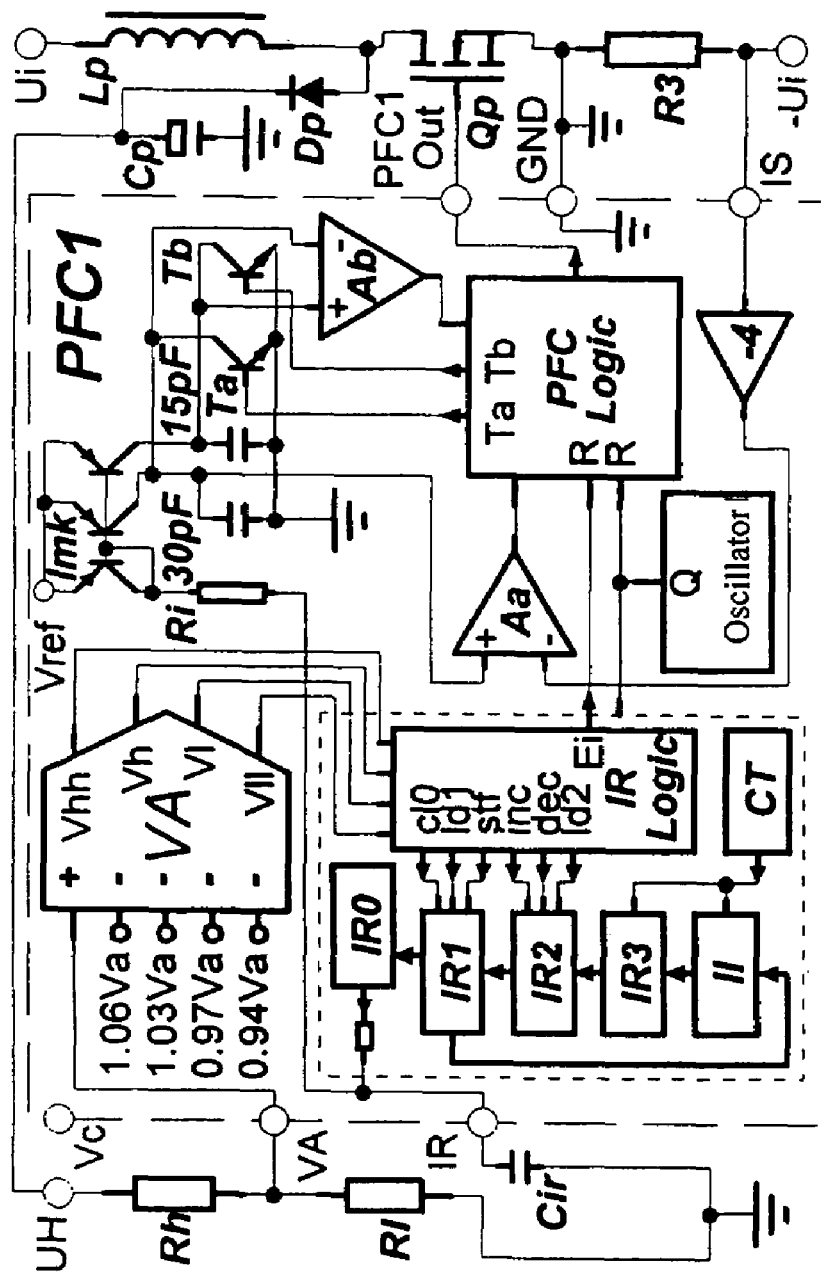
FIG. 4 is a schematic diagram of an undefined digital process and high quality PFC according to the preferred embodiment of the present invention.
Figure 5:
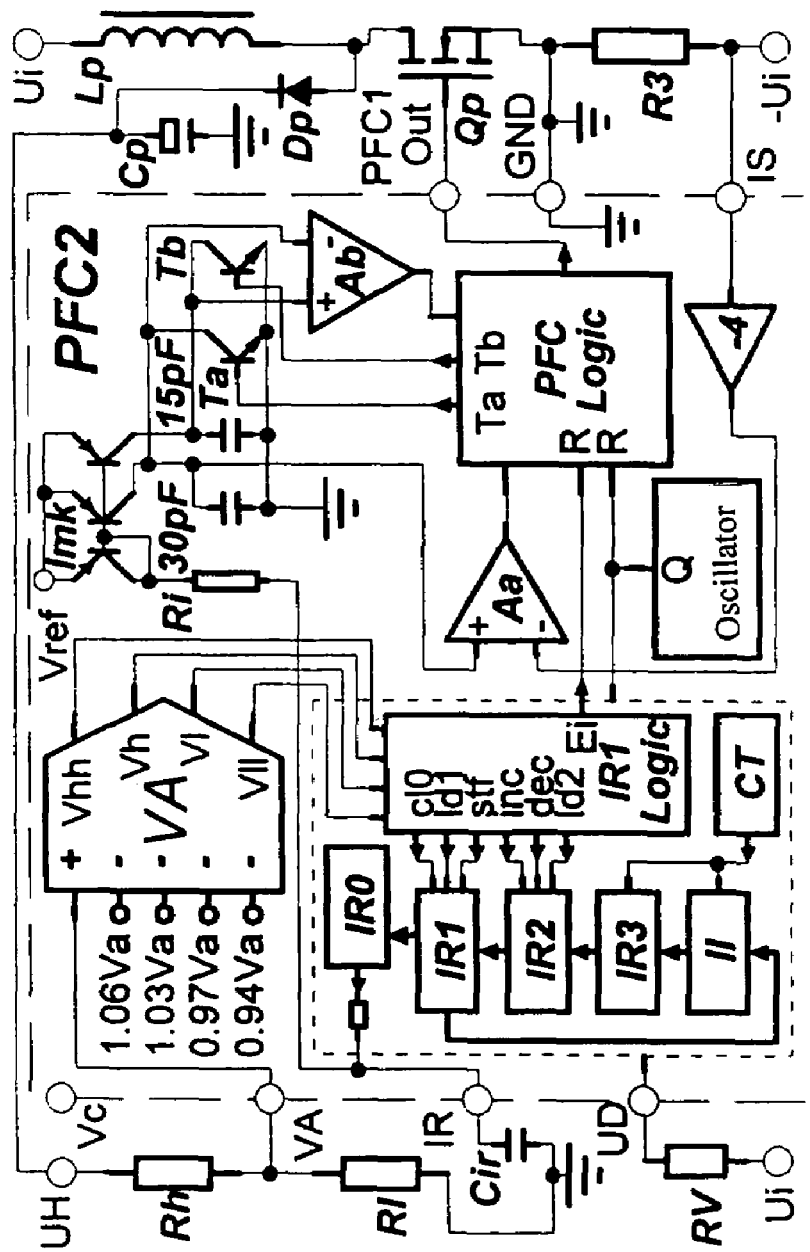
FIG. 5 is a schematic diagram showing an alternative mode of an undefined digital process and high quality PFC according to the preferred embodiment of the present invention.
Figure 6:
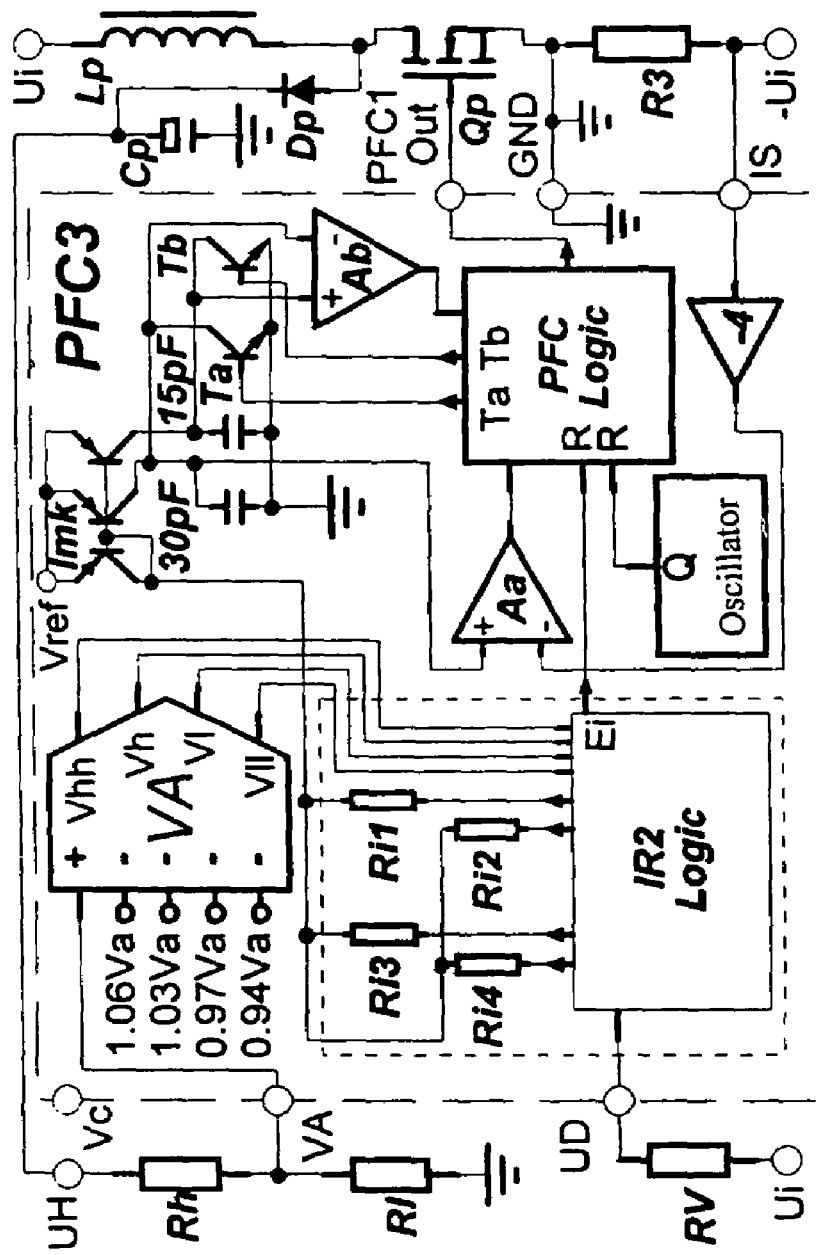
FIG. 6 is a schematic diagram showing a simplified digital process and high quality PFC according to the preferred embodiment of the present invention.

Referring to the FIG. 4, FIG. 5 and FIG. 6, the independent PFC are illustrated wherein IC are circumscribed within the dash line. R3 is adapted for checking PFC induction Lp current, and the PFC current (Lp current) reference output filter capacitor Cir and high power tube Qp could be resided outside or integrated within the IC. UD is commercial power rectifier synchronous input and RV is high voltage, high resistible resistance. Rh, R1 are PFC output voltage signal sample circuit, which is adapted for filtering the high frequency voice of thousands Hz. VA is adapted for checking the voltage signal, having a quad-voltage comparator for outputting a first high voltage Vhh, a second high voltage Vh, a first low voltage Vl and a second low voltage Vll signal, or an Analog/Digital converter. IR1 is a present PFC current reference output register; IR2 is PFC current reference output register; IR3 is major cycle PFC average current reference output register; II is present PFC current reference output register (IR1) major cycle accumulator; CT is a major cycle counter; IR0, IR1, IR2, and IR3 (according to the accuracy) are preferably located at the pin number 8 and pin number 9, while the CT is preferably located at pin number 12, and II is preferably located at pin number 20 and 21. it is noted that the major cycle CT should be larger than commercial cycle.

As shown in FIG. 4, PFC current reference generating logic, i.e. a digital processing unit, is adapted to delay time to an extent after power on reset. PFC logic sets a permissive signal to achieve the PFC soft enablement, and at the same time, set the IR2 and IR3 as the half value of its maximum value, and II and CT reset; after a major cycle is accomplished, a major cycle current reference output average value obtained from the II will be feed in the IR3, and then a new major cycle is re-enabled; voltage detecting 0000 (i.e. Vhh=0, Vh=0, Vl=0, Vll=0), IR1 is set to be the maximum value (stf), so as to prevent PFC outputting voltage falling down too much; voltage detection 1111, IR1 is set to 0 (c10), PFC logic is set prohibitive signal so as to prevent output voltage from being excess the upper limit, after the voltage detection is resumed to 0011, PFC logic sets a permissive signal; voltage detection non-0000 and non-1111, and PFC logic is set to be permissive, IR2 is sub-classed into IR1; voltage detection from 0000 to 0001, then 0011, IR2 is downwardly adjusted to search the real IR2 value; voltage detection from 0011 to 0001 and then 0011, IR2 downwardly adjusted; for those stable load, IR2 is downwardly or upwardly adjusted, minus one or add one could be applicable; for those load with a wide range, an adjustable equivalent register is embodied, and if IR2 needs to be continuously adjusted, the adjustable equivalent register will be increased or decreased accordingly. Therefore, there exists a necessity to enable a limited method for ensuring IR2 bigger than a set value, so as to guarantee PFC working in a continuous manner.

As shown in FIG. 5, PFC current reference generating logic (IR1 logic) is illustrated. it is quite similar with above mentioned IR logic, wherein the difference is that alternation of the IR2 is synchronously matting with the movement of UD (namely, UD sync or commercial sync); voltage detection 0000, to 0001, to 1111 to 0111, and UD sync is sub-classed into the IR2; voltage detection 0111, and UD sync IR2 downwardly adjusted; voltage detection 0001, UD sync IR2 upwardly adjusted; voltage detection 0011 non-enabled, so that Vh and Vl could be combined into a same signal, only 0000, 0001, 0111, and 1111 are left possible. However, if the two signals are not combined, the alternating frequency will be reduced; as a result, during the half cycle of commercial power, PFC current reference is constant.

As shown in FIG. 6, PFC current reference generating logic (IR2 logic), should be delay to an extent after the power on reset, and PFC logic permissive signal is set so as to strengthening the PFC softer enablement; voltage detection 1111, PFC logic set a prohibitive signal; UD sync voltage detecting 0111, PFC current reference is set Ri1; UD sync voltage detection 0111, PFC current reference is set Ri2; UD sync voltage detection 0001, PFC current reference is set Ri3; UD sync voltage detection 0000, PFC current reference is set Ri4; current references Ri1, Ri2, Ri3, Ri4 are arranged in a gradually increased manner, for example, 25%, 50%, 75%, 100%; or 40%, 60%, 80%, and 100%; In response to different version, VA should be correspondingly adjusted, namely, this difference could be deemed as D/A conversion. As a result, D/A conversion could be designed to four digits and IR2 logic could be designed to more complicated. What is more, PFC current reference value could be accurately calculated based on the voltage detection. It is noted that the variation of PFC current reference should be synchronously mated with UD.

The logic unit generated from PFC current reference shown in FIG. 4, FIG. 5 and FIG. 6 could directly replace the error amplifier of UC3854 IC and the like, therefore providing a safer and superb continuous current mode control IC; likewise, the logic units could replace the error amplifier of UC 3852 and the like, so as to form a safer and reliable non-continuous current mode, constant conductible time control IC.

PFC shown in the FIG. 4, FIG. 5, and FIG. 6 could be embodied as average current mode, which is working under CCM or DCM (for DCM, R3 detected PFC current should be filtered first to be send to −4 amplifier); −4 is PFC current amplifier, and the output of the PFC current amplifier is send to the timing circuit; link is a proportion current circuit, comprises three triodes or MOS tubes, one for current reference input, the other two for proportional output. The timing circuit comprises two proportioning capacitors, (shown as 30 PF and 15 PF, being either disposed within or outside the IC. Here, the two proportioning capacitors are shorten as Ct2 and Ct1), two triodes or MOS tubes Ta and Tb adapted for discharging the proportioning capacitors, and two amplifiers Aa and Ab for monitoring the voltages of the two proportioning capacitors, wherein a pair of digital signal are respectively feed into Ta and Tb, and then Aa and Ab will output a pair of digital signals. PFC reference outputting circuit outputs a current reference via Cir, Ri, a stabilized current generated from lmk will charge two capacitors having a 2:1 capacity ratio; the mechanism of the PFC logic (pulse width adjustable logic circuit) is to working synchronously with oscillator, but is under control of the PFC logic permissive signal; if the oscillator is on rising edge, and then PFC enter a cut-off period, that is to say, the PFC power tube Qp is off, and PFC induction Lp current decreased, Ct2 discharging tube Ta is off and stabilizedly discharging, Ct1 discharging tube Tb is kept on and CT1 voltage is kept 0; when the current represented by the Ct2 voltage reach the same level of the PFC induction voltage, i.e. the comparator Ab is on rising edge, Ct1 discharging tube Th is turned off and stabilizedly charging; when the Ct1 voltage catches up the Ct2 voltage, that is to say, the comparator Ab is on the rising edge, the PFC enters into an enablement period, PFC power tube Qp is enabled, PFC induction Lp current increased, Ct2 discharging tube Ta and Ct1 discharging tube Tb are enabled, Ct1 and Ct2 are discharged to be 0 voltage until the rising edge of the next oscillator is close and a new PFC cycle is initiated; It is proven that the controlling method according to the present invention, under a continuous current mode and R3 detection is free of filtration, PFC is a desirable average current mode, and more importantly, when Aa is on the rising edge, Lp current is average current.

VA voltage signal detection shown in the FIG. 4, FIG. 5 and FIG. 6, could apply A/D converter for outputting voltage value. So, PFC current reference ultimately could be converted into a D/A converter. However, the PFC current reference generating logic should be compliable with the following rules: VA input is non-filterable and high frequency voice free; preferably, Vhh logic is applicable, when vhh=1, PFC will prevent the PFC output voltage from being excess the upper limit; and preferably, Vll logic is applicable, when Vll=0, PFC sets a high or a maximum reference value, so as to prevent PFC outputting voltage from falling too much and to simplify the monitoring process, and preferably, Vll monitoring signal could be outputted. Even though Vhh and Vll is optional, but the Vhh and Vll PFC is safer and more reliable.

When Vhh=1 and Vll=0 are not guaranteed, PFC could maintain PFC current reference being constant during a major cycle. In other words, when a major cycle is on or off, the current reference is adjusted. Furthermore, the major cycle should be synchronously mating with the edges of half cycle's integer multiple or far above the commercial power's half cycle. According to the A/D of VA input and D/A conversion's complication, a more accurate PFC current reference logic sounds more reliable. As a result, the PFC techniques according to the present invention could be embodied as single processing unit having digital processing logic.

Accordingly, the digital processing PFC control circuit of the present invention has a desirable power factor and an ideal total harmonic distortion, and is deemed as a high quality PFC control circuit.

Figure 7:
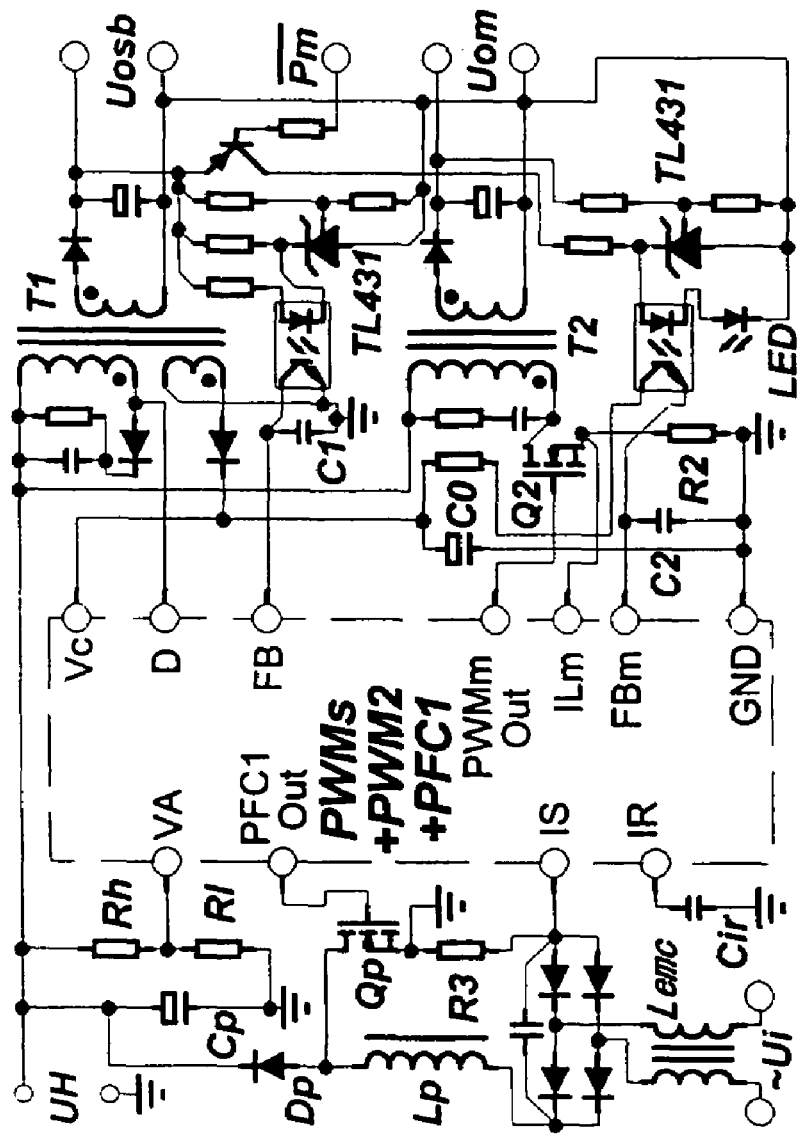
FIG. 7 is a schematic diagram of a green switch power supply according to the preferred embodiment of the present invention.
Figure 8:
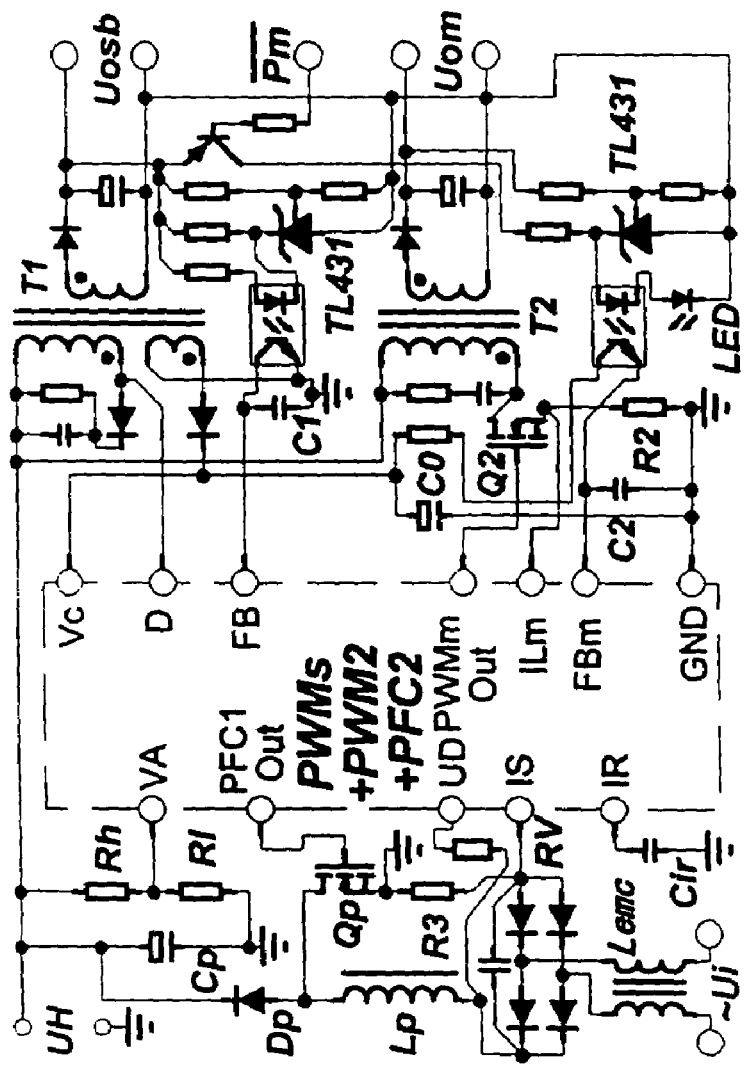
FIG. 8 is a schematic diagram of an alternative mode of a green switch power supply according to the preferred embodiment of the present invention.
Figure 9:
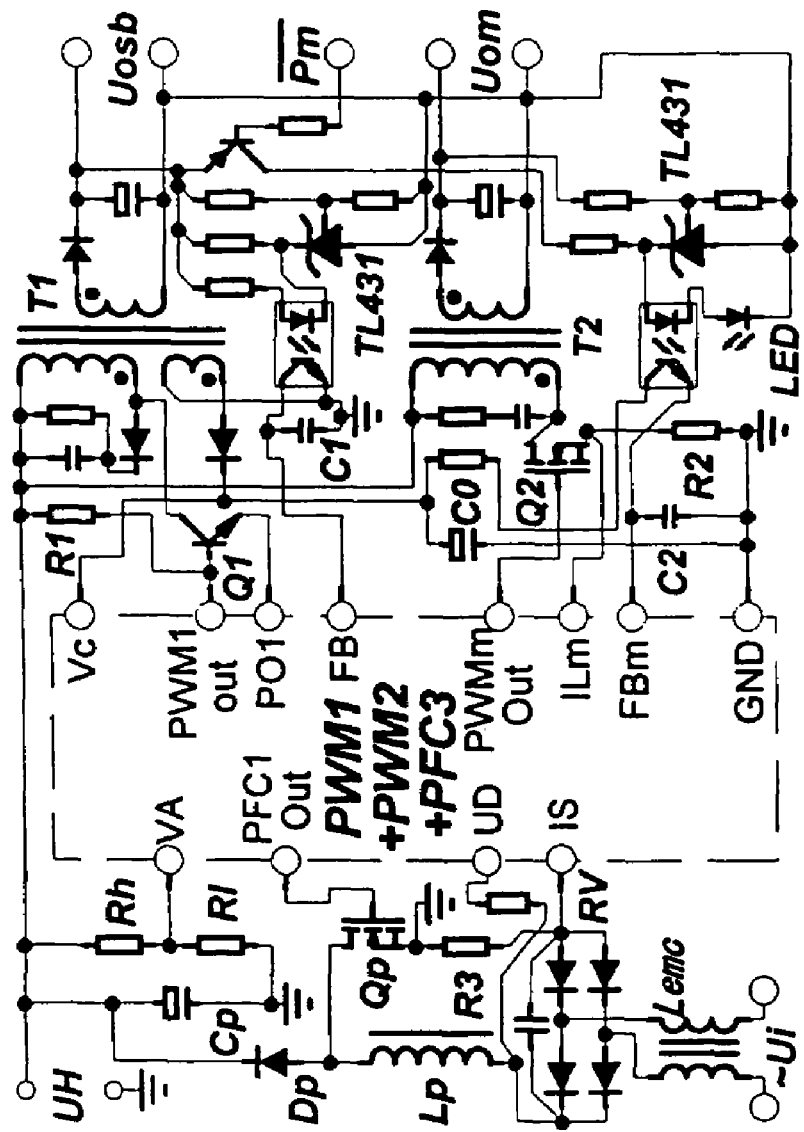
FIG. 9 is a schematic diagram of an alternative mode of a green switch power supply according to the preferred embodiment of the present invention.

Referring to FIG. 7, FIG. 8, and FIG. 9, a digital processing and high quality PFC green switch power supply for prevent overload and saturation is illustrated. The monolithic green switch power supply IC is applied according to the present invention, the standby error amplifier and the main error amplifier are applied as TL431, and there are standby isolation circuit and main isolation circuit. It is noted that—Pm remote control signal, in response to the main error signal, is being send to the main control circuit, a triode is applied by the remote control circuit as a switch for directly controlling the working power of the main feedback circuit. As shown in the Figs, three preferred green switche power supply ICs are resided with the dash line. For a better monitoring effect, a standby power supply overload monitoring signal, a main power supply overload monitoring signal, a PFC Vll monitoring signal, and preferably, a combined monitoring signal could be outputted from the IC. In case of PFC is non applicable, two remaining two switch power supply ICs are still in function. The above mentioned IC, main power supply, standby power supply, and PFC device could share an integrated oscillator or an oscillator disposed with an outside timing element.

Figure 10:
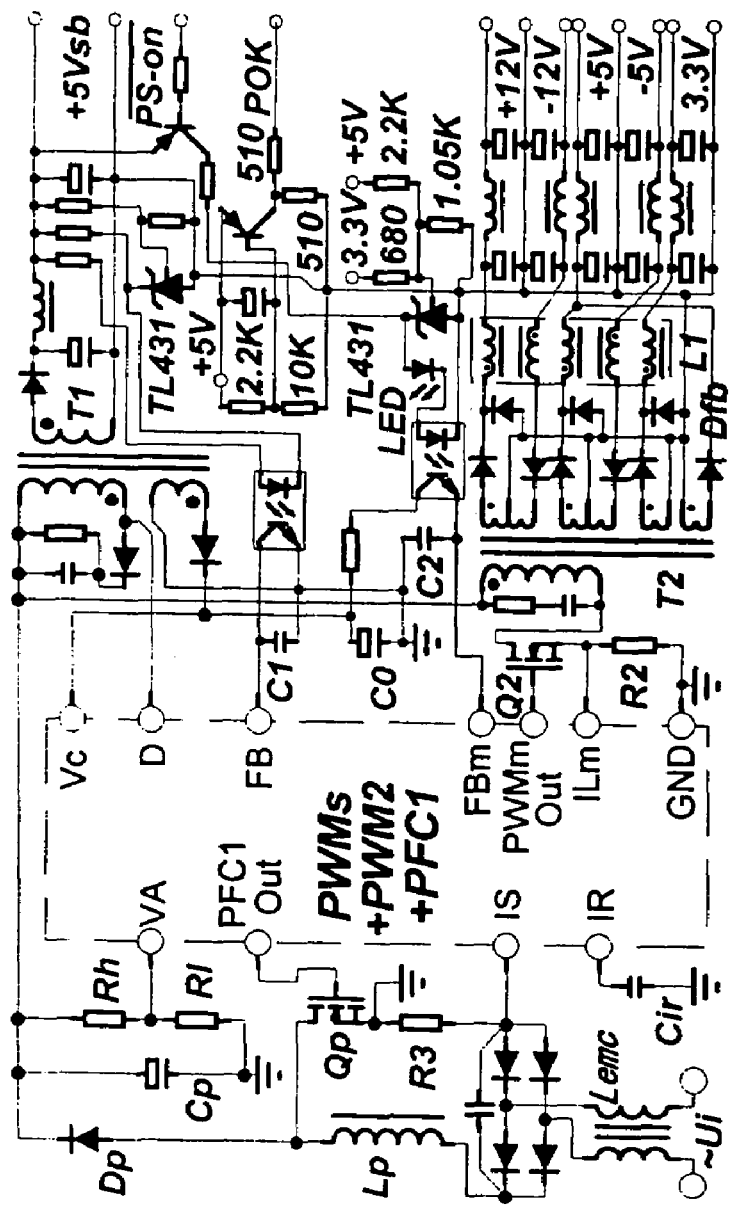
FIG. 10 is a schematic diagram showing a PC ATX standard green switch power supply being used in application.
Figure 11:
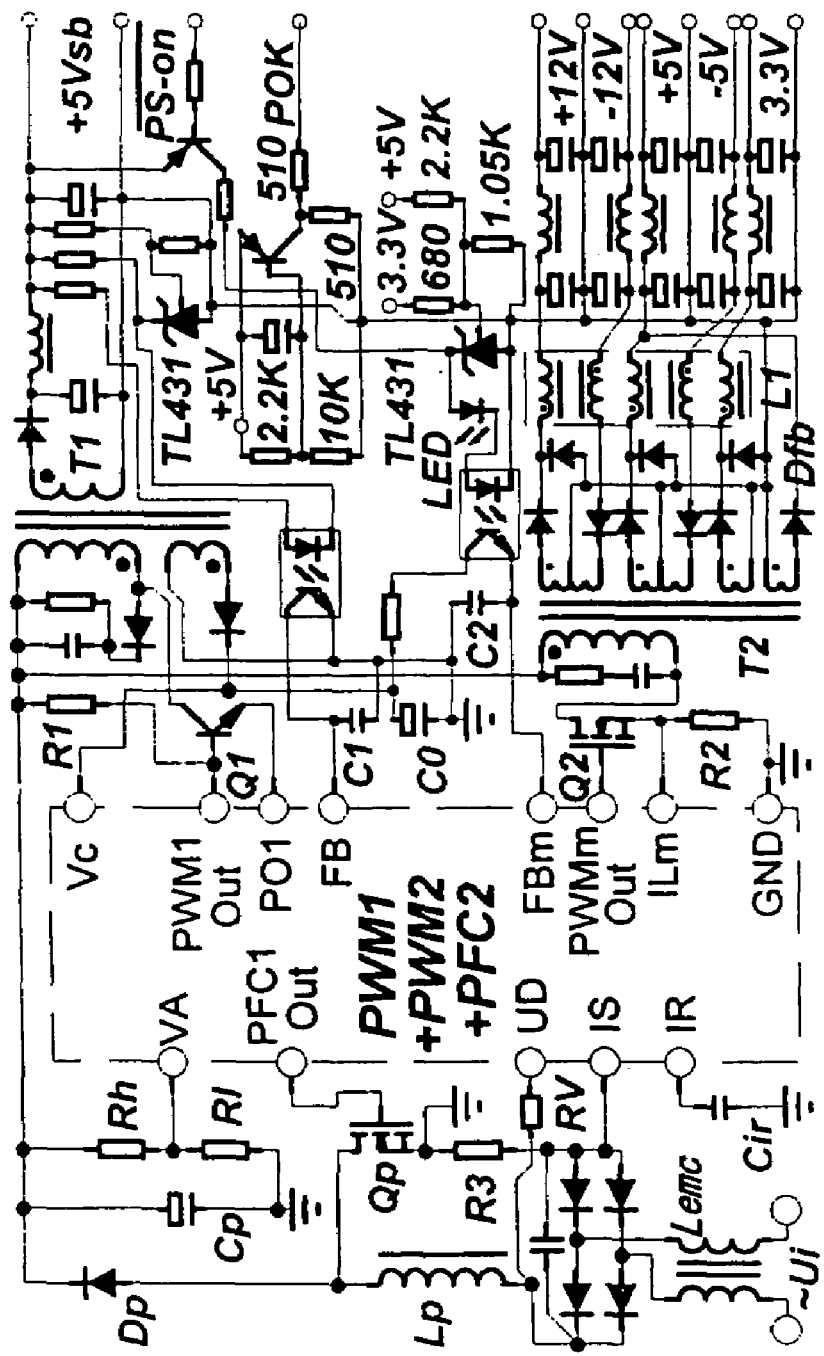
FIG. 11 is a schematic diagram showing another mode of PC ATX standard green switch power supply being used in application.
Figure 12:
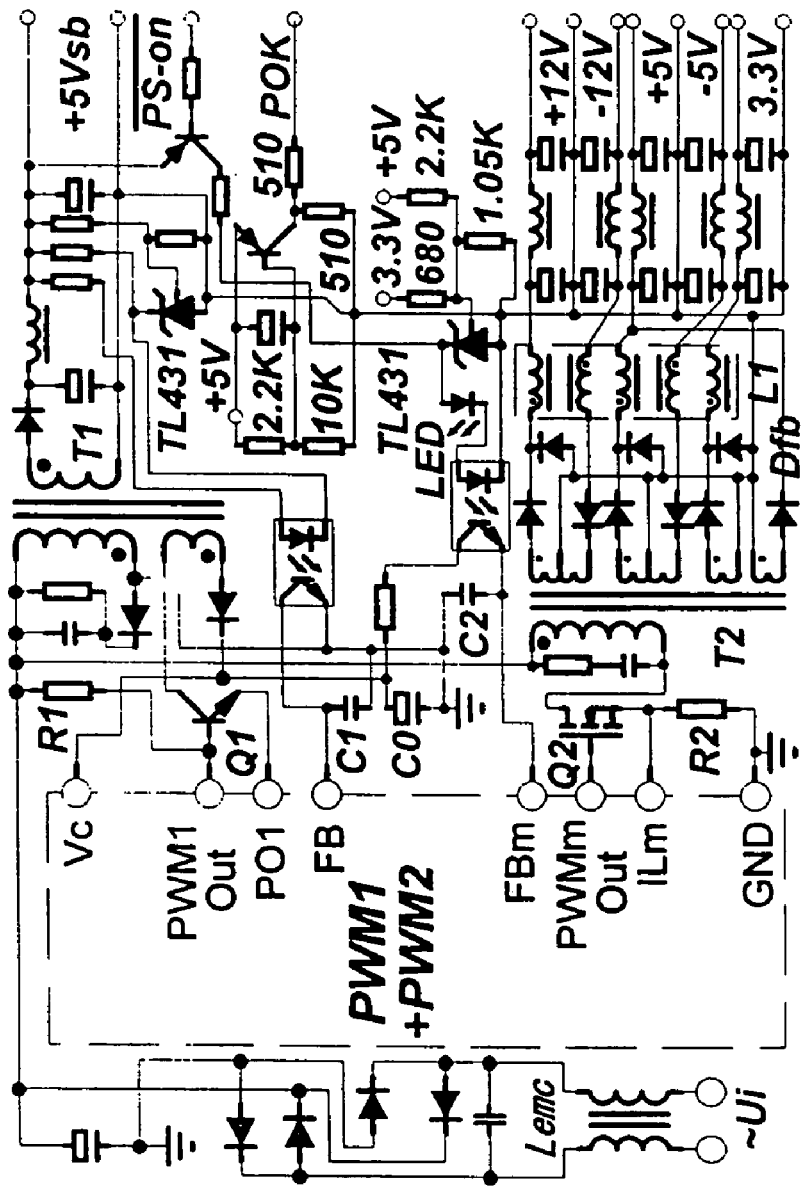
FIG. 12 is a schematic diagram showing a PC ATX standard green switch power supply being used in application according to the preferred embodiment of the present invention.

Referring to FIG. 10, FIG. 11, and FIG. 12, a PC standard (ATX, ATX12, SSI) green switch PC power supply with overload and saturation preventative function and digital processing PFC design are illustrated. The monolithic green switch power supply IC is applied according to the present invention, the standby error amplifier and the main error amplifier are applied as TL431, and there are standby isolation circuit and main isolation circuit. It is noted that—PS-on remote control signal, in response to the main error signal, is being send to the main control circuit, a triode is applied by the remote control circuit as a switch for directly controlling the working power of the main feedback circuit. The standby power supply is single ended, and the exciting current is adapted for discharging to main output through diode Dfb.

Figure 13:
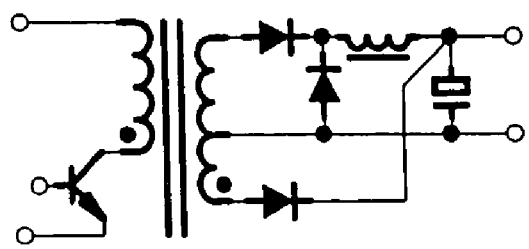
FIG. 13 is a schematic diagram showing a single ended hybrid switch power supply.
Figure 14:
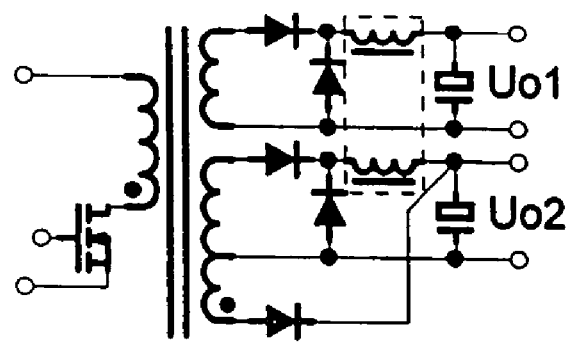
FIG. 14 is a schematic diagram showing a single ended hybrid switch power supply.

FIG. 13 and FIG. 14 show showing a single ended hybrid switch power supply, wherein the output power from Uo2 should be bigger than Uo1.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A green switch-mode power supply with standby function, comprising:
   a standby switched-mode power supply, comprising a standby converter circuit, a standby feedback circuit, and a standby control circuit; and
   a main switched-mode power supply, comprising a main converter circuit, a main feedback circuit, and a main control circuit, wherein said main switched-mode power supply is subjected to a remote control signal to be on/off, wherein said main feedback circuit comprises a main sampling circuit, a main error amplifier, a main isolation circuit, and a remote control circuit, wherein said main control circuit comprises a main pulse adjustable circuit, a main driven circuit and a main switched-mode power supply prohibitive circuit; and
   a supplemental circuit, comprising an initiating circuit, a rectifying filter circuit, wherein DC terminal of said standby switched-mode power supply, said standby control circuit, DC input terminal of said main switch-mode power supply and said main control circuit are common grounded; and
   a monolithic green switched-mode power supply IC integrated with said standby control circuit, said main control circuit and said initiating circuit of said supplemental circuit, wherein said monolithic green switched-mode power supply IC is activated by said initiating circuit and is power-supplied by said standby switch-mode power supply,
   wherein said remote control signal is sent to said main control circuit in response to a main error signal for controlling said main switch-mode power supply on/off, wherein when said remote control signal is an "off" signal, said remote control circuit force said main error signal being less than a predetermined threshold value, when said remote control signal is an "on" signal, said remote control circuit is deactivated, such that said main sampling circuit outputs a voltage signal to said main error amplifier to generate an optically coupled current through said main isolation circuit so as to output a main error signal; wherein said main error signal is monitored by said main switched-mode power supply prohibitive circuit, when said main error signal is smaller than said threshold value, said remote control signal is assumed to be said "off" signal, such that said switched-mode power supply prohibitive circuit forces said main driven circuit to output a low electric level so as to switch off said main switch-mode power supply, and when said main error signal is not smaller than said threshold value, said remote control signal is assumed to be said "on" signal, that said main pulse adjustable circuit generates a main pulse in responsive to said main error signal, such that said main driven circuit is normally operating to switch on said main switch-mode power supply.

2. The green switch-mode power supply with standby function, as recited in claim 1, wherein an optical coupling is applied in said remote control circuit for sending said remote control signal to said main control circuit, wherein when said remote control signal is an "off" signal, said main switched-mode power supply prohibitive circuit forces said main driven circuit to output a low electric level so as to switch off said main switch-mode power supply, and when said remote control signal is an "on" signal, said main pulse adjustable circuit generates a main pulse in responsive to said main error signal, such that main driven circuit is normally operating to switch on said main switch-mode power supply.

3. The green switch-mode power supply IC with standby function, as recited in claim 2, wherein said standby control circuit further comprises a standby pulse adjustable circuit and a standby driven circuit, said standby pulse adjustable circuit generating a standby pulse signal in response to a standby error signal, wherein said main control circuit further comprises said main pulse adjustable circuit, said main driven circuit and said main switch-mode power supply prohibitive circuit; wherein said remote control signal is sent to said main switched-mode power supply prohibitive circuit, when said remote control signal is an "off" signal, said main switched-mode power supply prohibitive circuit forces said main driven circuit to output a low electric level so as to switch off said main switch-mode power supply, and when said remote control signal is an "on" signal, said main pulse adjustable circuit generates a main pulse in responsive to said main error signal, such that main driven circuit is normally operating to switch on said main switch-mode power supply.

4. The green switch-mode power supply IC with standby function, as recited in claim 2, wherein said IC is further integrated with a PFC error amplifier and a PFC control circuit, wherein said PFC control circuit comprises a PFC pulse adjustable circuit and a PFC driven circuit.

5. The green switch-mode power supply IC with standby function, as recited in claim 3, wherein said IC is further integrated with a PFC error amplifier and a PFC control circuit, wherein said PFC control circuit comprises a PFC pulse adjustable circuit and a PFC driven circuit.

* * * * *